United States Patent [19]

Allen et al.

[11] Patent Number: 4,595,481

[45] Date of Patent: Jun. 17, 1986

[54] DISK CARRIER

[75] Inventors: Ronald Allen, San Jose; Tu Chen, Saratoga, both of Calif.

[73] Assignee: Komag, Inc., Milpitas, Calif.

[21] Appl. No.: 642,853

[22] Filed: Aug. 21, 1984

[51] Int. Cl.[4] .............................................. C23C 15/00
[52] U.S. Cl. .................................... 204/298; 118/500
[58] Field of Search .......................... 204/192 R, 298; 118/500; 156/345, 643

[56] References Cited

U.S. PATENT DOCUMENTS

| | | | |
|---|---|---|---|
| 4,049,523 | 9/1977 | Boehnke et al. | 204/298 |
| 4,141,811 | 2/1979 | Yerkes et al. | 156/643 |
| 4,222,839 | 9/1980 | Goodner et al. | 204/192 E |
| 4,336,438 | 6/1982 | Uehara et al. | 204/192 E |
| 4,424,096 | 1/1984 | Kumagai | 204/192 E |
| 4,473,455 | 9/1984 | Dean et al. | 204/298 |
| 4,500,407 | 2/1985 | Boys et al. | 204/298 |

*Primary Examiner*—John F. Niebling
*Assistant Examiner*—Terryence Chapman
*Attorney, Agent, or Firm*—Thomas S. MacDonald; Alan H. MacPherson; Steven F. Caserza

[57] ABSTRACT

A carrier is provided to hold a disk while magnetic material is plated simultaneously on the two surfaces of the disk. The carrier contains a first opening substantially the same diameter as the disk and a second opening formed about a center line offset from the center line of the first opening so as to form a recess around a portion of the edge of the first opening. The recess allows the disk to be mounted into the carrier by placing the disk in a portion of the first opening and in a portion of the recess without having a surface of the disk touch the surface of the recess. The disk is then lowered into the first opening while leaving the remainder of the carrier material adjacent the recess to block the flow of plasma and impurities from one side of the disk to the other during the coating of the surfaces of the disk with magnetic media. A plug is provided for placement in the center hole of the disk. The plug is in two portions, one of which contains a spring means for flexibly holding the two halves together during the coating of the disk with magnetic media so that thermal expansion of the disk during coating does not result in the plug rattling or coming loose from the disk. The plug also serves as a knob or handle by which the disk can be handled, carried or mounted. A plurality of openings are provided in one carrier to allow both surfaces of a corresponding plurality of disks to be coated simultaneously with magnetic media.

5 Claims, 15 Drawing Figures

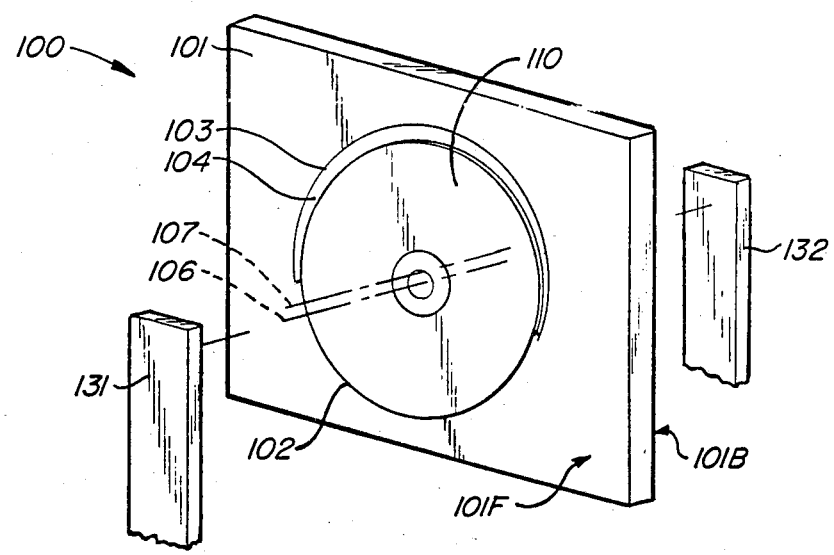
FIG._1.
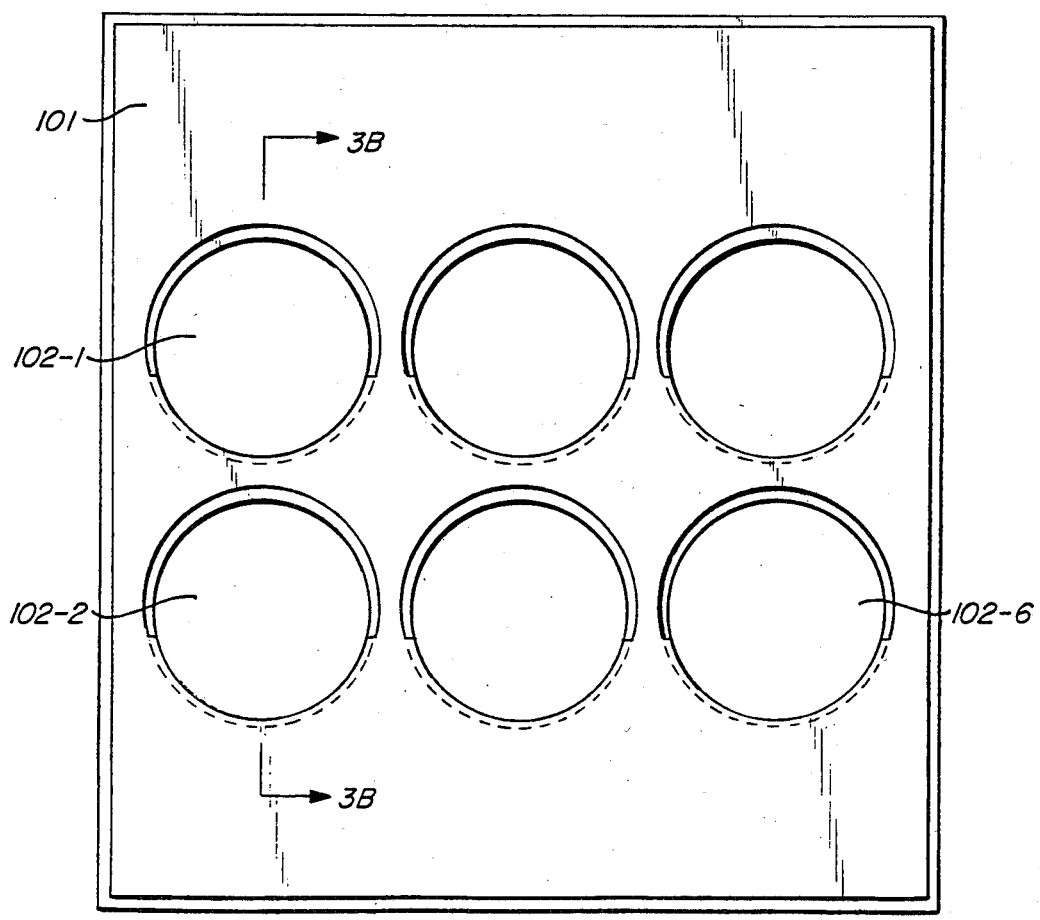
FIG._4.

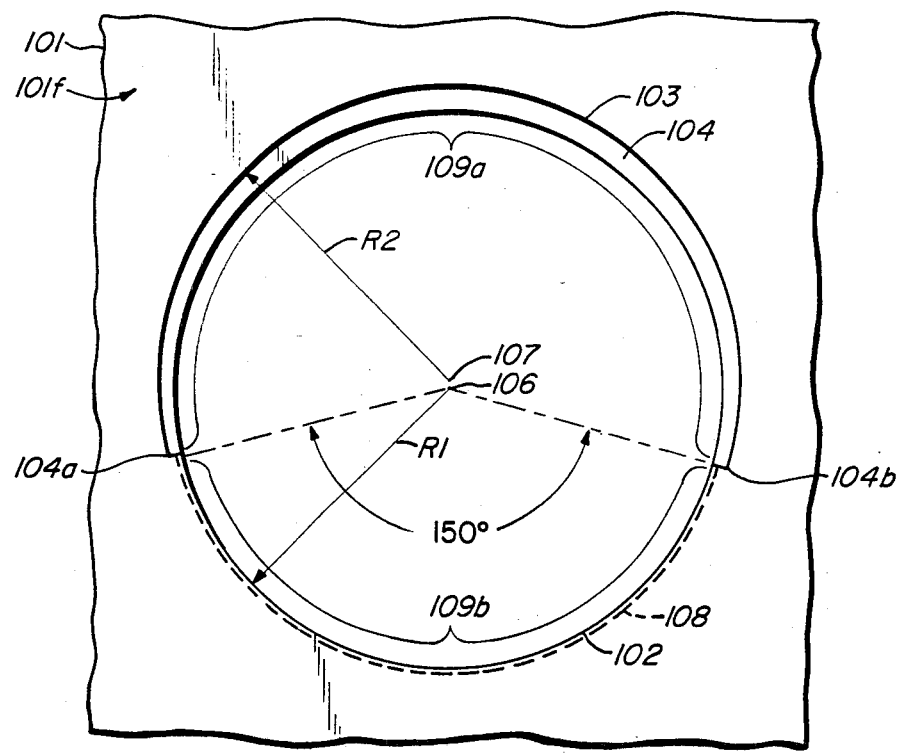
FIG._2a.
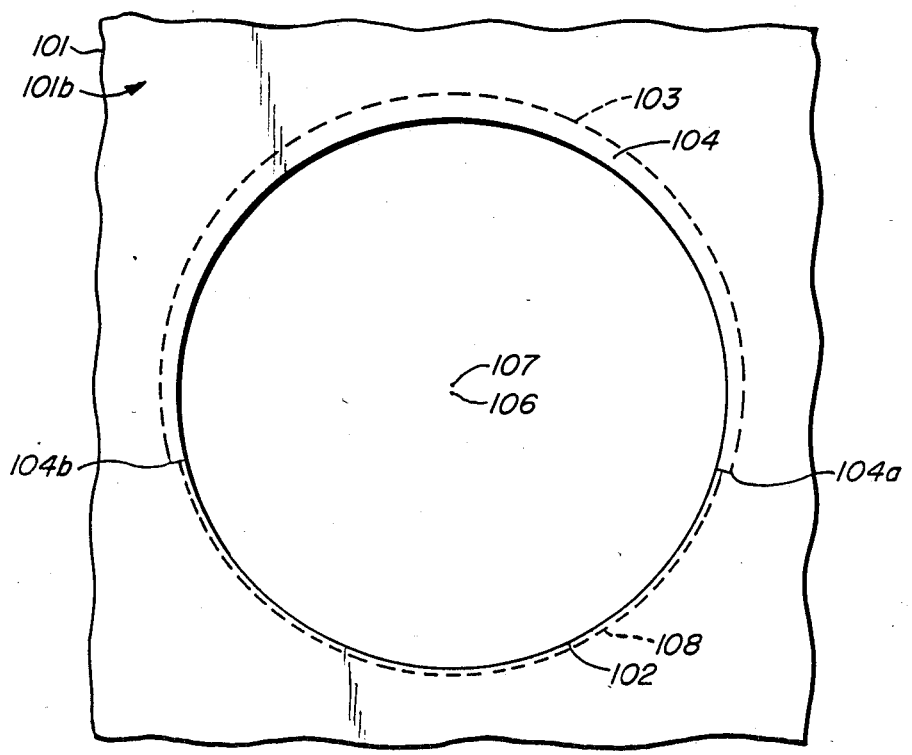
FIG._2b.

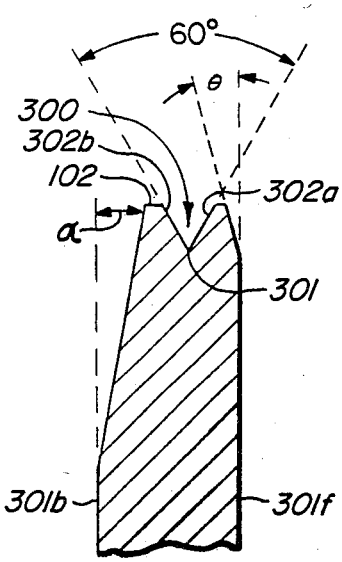
FIG._3a.
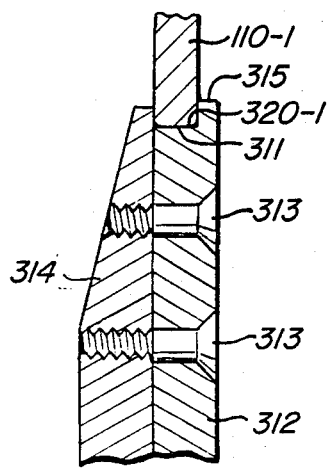
FIG._3c.
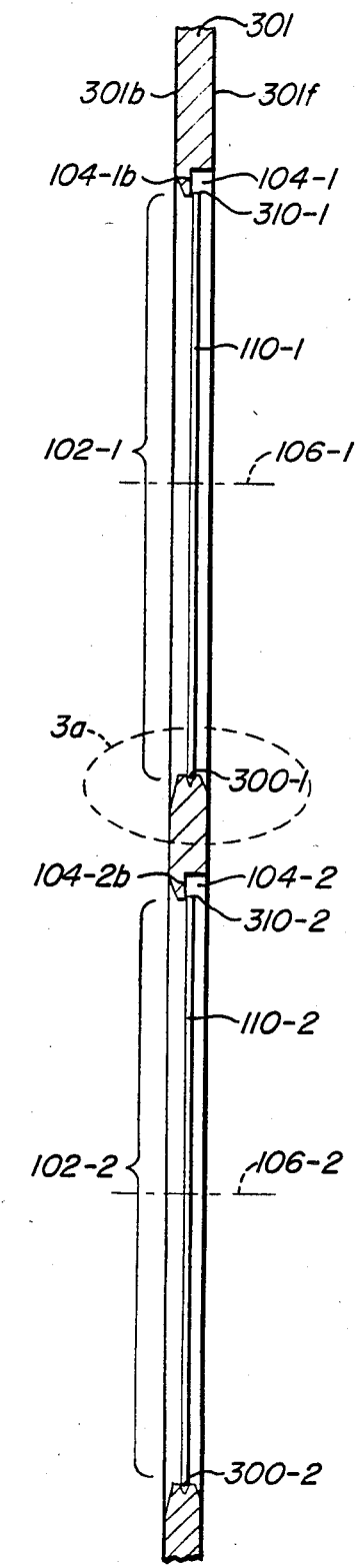
FIG._3b.

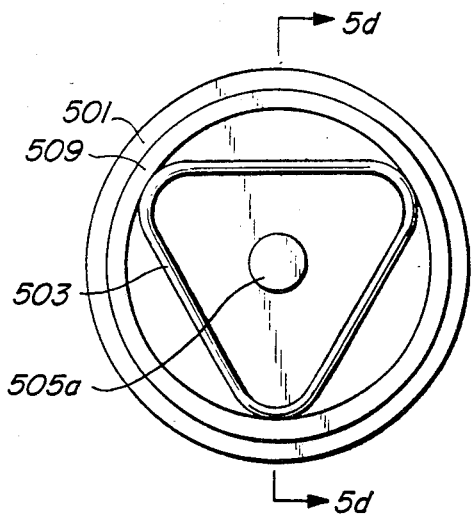
FIG._5a.
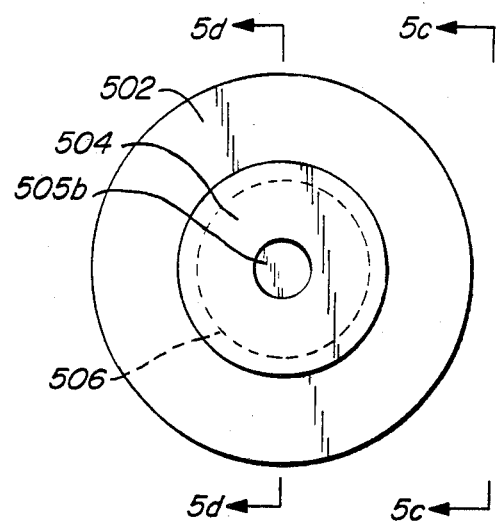
FIG._5b.
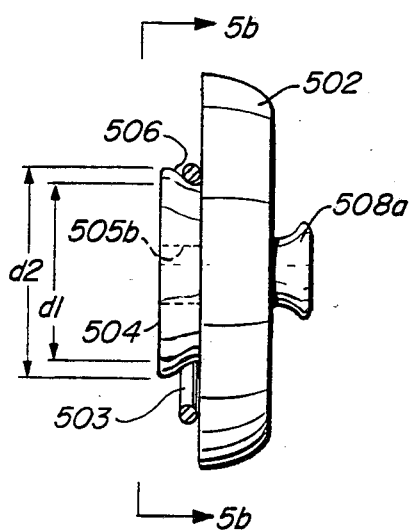
FIG._5c.
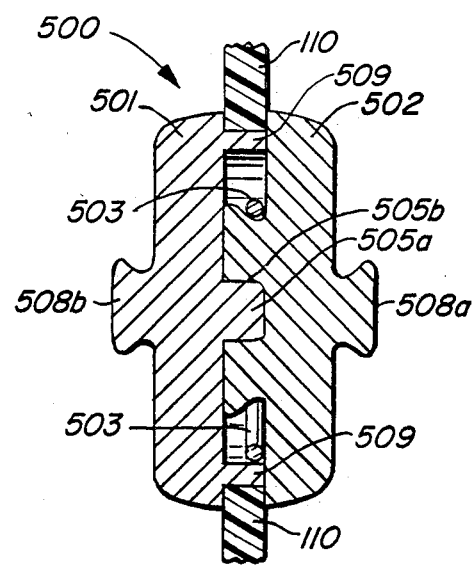
FIG._5d.

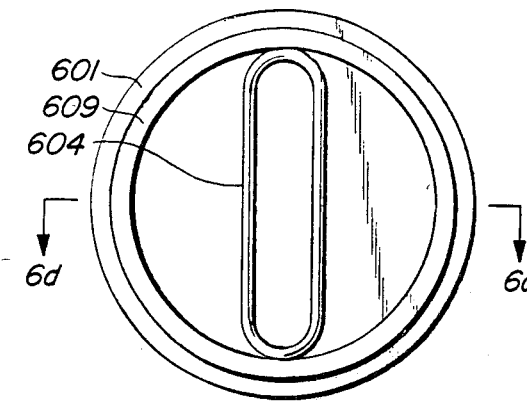
FIG._6a.
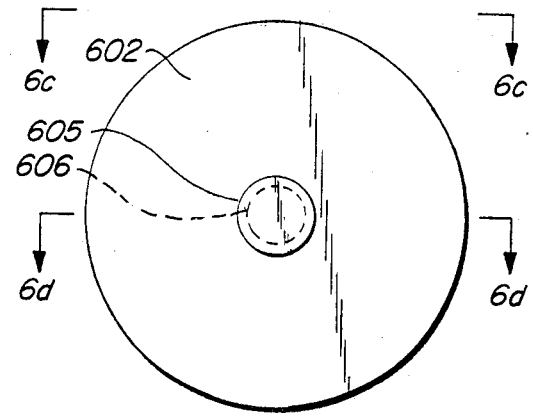
FIG._6b.
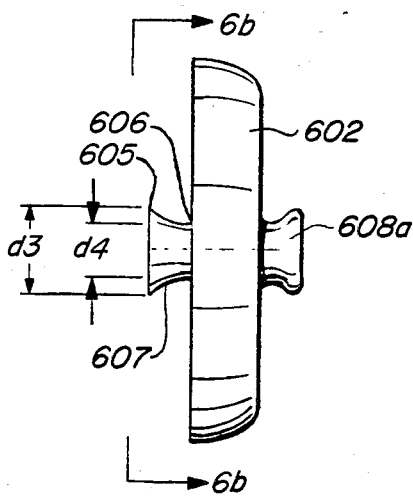
FIG._6c.
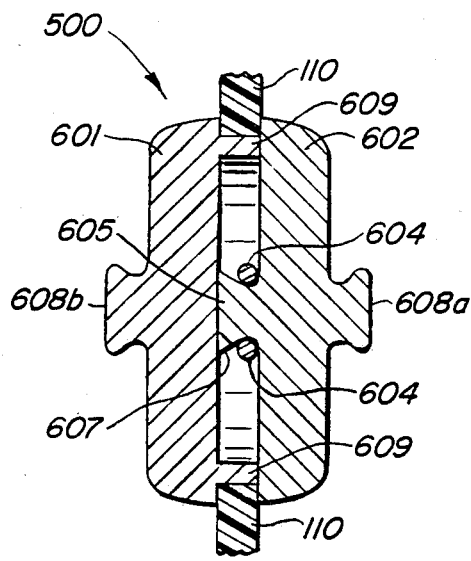
FIG._6d.

DISK CARRIER

BACKGROUND OF THE INVENTION

1. Field of the Invention

This invention relates to disks for use in disk drives and similar memory systems and in particular to a disk carrier for use in the manufacture of a disk which allows magnetic material to be coated simultaneously on the two surfaces of a disk without the passage of material from one side to the other side of the disk during the coating process.

2. Prior Art

The manufacture of memory disks for use in disk drives and similar systems is well known in the art. In the manufacture of such disks, an aluminum or other suitable blank is coated on both sides with magnetic media in which information will be stored. Typically the coating is done by sputtering. To implement the sputtering process it is well known to use vertical electrodes on each side of the disk and thus coat both surfaces of the disk simultaneously. During the coating process two things can happen. First, one electrode can be cross-contaminated by sputtered material from the other electrode passing by the disk. This causes particles to form on the target (i.e. the electrode) which later flake off and then land on the disk thereby changing the composition of the magnetic media and forming impurities on the surface of the disk. Second, the plasma from one electrode can interfere with the plasma from the other electrode thereby preventing uniform depositing of magnetic media on each disk surface. To prevent these two things from happening in the formation simultaneously of magnetic media on both sides of the disk, one electrode must be completely screened from the other electrode.

In the coating of magnetic media on disk surfaces, a disk carrier is commonly used. The disk carrier must be designed so that it will not cause shadows on those portions of the disk surface on which magnetic media and other layers of material are being sputtered. Also, the carrier must be such that the disk can be easily loaded into the carrier by a human or a robot. In the prior art, the disk carriers have not been completely satisfactory in that the disk carrier typically has an opening between the top surface of the carrier and the disk which allows cross-contamination and plasma interference during the coating process.

SUMMARY OF THE INVENTION

In accordance with this invention, the above problem of the prior art is overcome by use of a disk carrier which allows the disk to be easily loaded into the carrier by a human or robot but which at the same time prevents cross-contamination, shadowing, and interference by portions of the plasma of one electrode coating one side of the disk with magnetic media or other materials with the plasma generated by the other electrode coating the other side of the disk with magnetic media or other materials.

In accordance with this invention, a disk holder or carrier is formed with at least one opening for receipt of a disk. The opening is specifically shaped so that the top circumference of a disk when placed in the opening is congruent with the top circumference of the opening in the disk carrier. A typical disk has a chamferred edge around its circumference. The bottom edge of the opening in the disk carrier is provided with a "V" groove or other channel or retainer so that the disk only rests on its chamferred edge. In accordance with this invention the "V" groove can be replaced with any other appropriately shaped channel or a pin structure such as three pins placed selected distances apart around the bottom portion of the opening to hold the chamferred edge of the disk. The material adjacent the top of the opening in the carrier is recessed a selected amount (typically one-half the thickness of the to-be-coated disk beyond the center plane of the carrier plus a selected tolerance (in one embodiment +0.005 to 0.010") depending on the accuracy of the loading system) so that the disk can pass through the recessed portion during loading while no portion of the surface of the disk touches the carrier at any time. A portion of the carrier behind the recess extends down congruently to the edge of the disk when the disk is mounted in the opening. This recess in the carrier material adjacent the top of the disk both isolates one electrode from the other electrode and allows the disk to be loaded in the carrier without touching the disk surface to the carrier.

The disk carrier of this invention is a one piece carrier with no moving parts. The elimination of moving parts eliminates the need to align the disk to the carrier and thus eliminates particle generation and reduces set-up time.

As part of this invention, a special plug is provided for placement in the opening in the center of a disk. The plug allows for thermal expansion of the disk during the sputtering process while holding the disk tight to prevent particle generation. During the sputtering operation, the plug cannot rattle on the disk or drop off when the disk expands.

This invention will be more fully understood in light of the following detailed description taken together with the drawings.

DESCRIPTION OF THE DRAWINGS

FIG. 1 shows an isometric view of a disk carrier of this invention for use in sputtering magnetic media simultaneously on both sides of a memory disk;

FIGS. 2a and 2b show the front and back views of the disk carrier of this invention wherein the recessed eccentric opening superimposed on the opening in the front of the disk carrier in which the disk is mounted is apparent from comparison of the front and the back views of the carrier;

FIGS. 3a and 3b illustrate in cross-section a side view of a carrier containing at least two disks so as to show the V groove bottom edge of each opening for retention of the chamferred edge of each disk in the bottom surface of the corresponding opening in the carrier and also illustrate the recess of this invention at the top portion of each opening in the carrier;

FIG. 3c illustrates in cross-section a side view of an alternative pin structure for retention of the chamferred edge of a disk in the bottom surface of the opening in the carrier.

FIG. 4 illustrates a plurality of openings formed in a larger carrier capable of holding a corresponding plurality of disks during the sputtering of magnetic media on the two surfaces of each of the disks.

FIGS. 5a through 5d illustrate a center plug for placement in the center of each memory disk during the sputtering operation in accordance with this invention.

FIGS. 6a through 6d illustrate a second embodiment of the center plug for placement in the center of each memory disk during the sputtering operation in accordance with this invention.

DETAILED DESCRIPTION

While selected embodiments of this invention will be described below, other embodiments will be obvious in view of the following disclosure to those skilled in the art. Thus the following description is meant to be illustrative only and not limiting.

FIG. 1 illustrates an isometric schematic view of the carrier 100 of this invention with disc 110 mounted in opening 102 formed in carrier plate 101. Sputtering targets (i.e. electrodes) 131 and 132 are placed in a well-known manner on either side of disk 110 mounted in carrier 100. As shown in FIG. 1, carrier 100 comprises a block of material in the form of a carrier plate 101 in which is formed an opening 102. Opening 102 is circular with its center at center line 106. Disk 110 mounts congruently within circle 102. Around and above the top portion of opening 102 a portion of material 101 is removed to form a recess 104, the outer circumference 103 of which is circular and has a center given by the intersection of center line 107 with the plane of disk 102. Recess 104 extends only part way through material 101 sufficient to allow disk 110 to rest vertically in carrier 100 without either the front or back face of disk 110 actually touching the material 101 of carrier 100.

As a feature of this invention, recess 104 is formed so that disk 101 can be mounted in carrier 101 by hand or by a robot without either surface of the disk touching material 101. Any time disk 110 touches material 101 small particles are generated or the surface is damaged. These particles may cause defects in the magnetic media being formed on both surfaces of disk 110 (FIG. 1). The disk carrier 100 of this invention substantially eliminates the generation of such particles or scratches, thereby substantially increasing the quality of disks capable of being fabricated. The depth of recess 104 must be just sufficient to allow the disk to be inserted in without touching the disk carrier.

FIGS. 2a and 2b illustrate the front and back views respectively of one embodiment of the disk carrier of this invention. As shown in FIG. 2a, the opening 102 in the carrier material 101 is formed with a radius R1 about center 106. An internal groove 108 (shown in dash lines in FIG. 2a and 2b) is formed in the bottom 150° (75° to either side of the vertical radius to the bottom of portion 109b opening 102) of the edge of opening 102. The length of groove is not critical and indeed the groove must merely be of such a length as to hold the disk. A portion of the remainder of the circumference of opening 102 is occupied by recess 104. In the embodiment shown in the recess 104 is formed for 105° on either side of the vertical radius R1 from center 106 to the top of circumference of opening 102. The center plane of the carrier is defined as the plane parallel to the two surfaces of the disk which is occupied by the center of the disk when the disk is mounted vertically in the carrier. Recess 104 is formed with an outer circumference 103 generated by radius R2 rotating about center point 107. Center 107 is offset from center 106 in one embodiment suitable for use in fabricating 5¼" disks, by, for example, 0.1969 inches. The use of two off-center circles to form recess 104 simplifies the manufacture of the carrier of this invention. The recess 104 is formed by removing material within and over portion 109a of circumference 103 of carrier material 101 from the front face of the carrier to a selected depth. Typically, this depth is such that the distance from the center plane of a disk placed in the carrier to the back wall of recess 104 is, equal to half the thickness of the to-be-coated disk, plus a 0.005" tolerance, so that the back surface of the disk does not touch the disk carrier upon insertion of the disk into or removal of the disk from the carrier. This depth is selected to ensure that the back wall of the recess 104 is aligned with the back surface of the to-be-coated disk within a selected tolerance.

The bottom portion 109b of opening 102 has formed therein in one embodiment a "V groove 108" with (as shown in FIG. 3a) an angle of 60° and a depth of 0.060 inches (1.53 millimeter). The bottom vertex of the V groove is formed 0.060 inches from the external front surface 301f of carrier 100.

FIG. 3a illustrates in more detail the cross-section of one embodiment of the edge. In FIG. 3a, V groove 300 is formed in edge 102 to a depth of 0.060 inches. The center of the V groove 301 is 0.060 inches from front face 301f of carrier 101. The V groove has two surfaces 302a and 302b which form an angle of 60°, each surface forming an angle of 30° with the vertical. The front face 301f is chamferred at 10° from the vertical for a distance of 0.060 inches before the top of edge 102 is reached and the back face 301b is chamferred 10° from the vertical for a distance of about one-quarter inch before the top of edge 102 is reached. Of course, other means for holding the bottom of the disk in place in the carrier can be used. Thus, as shown in FIG. 3c, two or more pins (described below) can be attached to the front surface of the carrier to hold the bottom edge of the disk in proper position in the carrier.

The relationship of carrier 100 to a disk is shown in more detail in a side view in FIG. 3b. FIG. 3b illustrates in cross-section two openings formed in a carrier 301 capable of holding at least two disks 110-1 and 110-2. Disks 110-1 and 110-2 are shown mounted in the carrier with the chamferred edges 310-1 and 310-2 of each disk 110-1 and 110-2 respectively resting in the bottom V groove of the corresponding openings 102-1 and 102-2. The recesses 104-1 and 104-2 are clearly depicted in the cross-sectional view. Such recesses allow the disks 110-1 and 110-2 to be entered into the openings 102-1, 102-2 with the center of each disk 110-1 and 110-2 above its corresponding at-rest center line 106-1 and 106-2, respectively, and then lowered onto the bottom edge V grooves 300-1 and 300-2 of openings 102-1 and 102-2. The back side 104-1b of recess 104-1 and the back side of 104-2b of recess 104-2 is selected to be half the thickness of the disk plus a selected tolerance from the center plane of the corresponding disk 110-1 and 110-2, respectively. The center plane of the disk is that plane occupied by all points on the disk equidistant from the two plane surfaces of the disk. The depth depths of the recesses 104-1 and 104-2 are measured from this center plane when the disks are mounted vertically in the carrier as shown in FIG. 3b.

An alternative to the "V" groove of FIG. 3a is a pin structure shown in FIG. 3c. Disk 110-1 is shown mounted with the chamferred edge 320-1 resting in the step-like recess 311 of a clamp 312. Clamp 312 is attached by screws 313, or some other fastening means to the carrier 314. The protruding rectangular portion 315 is flush against one side of disk 110-1, and the uppermost portion of carrier 314 is flush against the other side so as to hold disk 110 in place.

FIG. 4 illustrates a carrier with a plurality of six openings 102-1 through 102-6 formed in the carrier for receipt of a corresponding number of disks. Thus the carrier of FIG. 4 can be used in the sputtering simultaneously of magnetic media on both sides of six magnetic disks. Each opening 102-1 through 102-6 in carrier 101 is as described above in conjunction with FIGS. 1, 2a, 2b, 3a, and 3b.

In accordance with this invention the top edge of each opening 102 contains a portion 104 recessed an amount into the carrier 100 selected so that the surface of the disk 110 (FIG. 1), for example, does not touch the carrier material 101. Such a carrier is particularly suitable for loading using robots because robots can stop within 100 microinches of a surface. This prevents particle generation which would interfere with the quality of the resulting coated disk.

The surface of the disk carrier adjacent the disk is beveled 10° or less from the plane of the surface to prevent shadowing by the edge of the opening in the carrier of the material being coated on the surfaces of the disk.

The recess 104 at the top of each opening 102 in the carrier serves two purposes. It provides isolation so that magnetic media can be coated simultaneously on both sides of the disks without cross-contamination and without interference. Secondly, it allows the disk to be loaded into the carrier without touching the disk surface to the carrier.

In the prior art, the opening in which the disk was mounted for coating was formed with a larger diameter than the disk. Unfortunately the annular open space between the edge of the disk and the opening in the carrier allowed plasma intereference and cross-contamination. While it has been proposed to use a movable gate which can come down on top of the disk to close this annular open space after the disk has been loaded in the carrier, movement of one material relative to another generates particles which contaminate the magnetic media formed on the surface of the disk. This type of carrier is also harder and thus more expensive to make. Accordingly, the disk carrier of this invention comprises a one piece unitary carrier without moving parts which is easily loadable with the to-be-coated disk and which automatically self-aligns the disk in the carrier to prevent cross-contamination and plasma interference. The disk carrier of this invention is also cheaper to make than prior art disk carriers with movable parts. The use of a unitary carrier saves the need for any alignment of the disk to the carrier and thus reduces the cost of both the carrier and its use in the coating a disk and avoids moving parts.

FIGS. 5a through 5d illustrate one embodiment of a center plug 500 for placement in the center of the disk to prevent plasma from flowing through the opening in the center of the disk from one side to the other of the disk. The plug not only blocks the opening in the disk but serves as a knob or handle by which the disk can be handled, carried and mounted in the carrier 100 (FIG. 1). As shown in FIG. 5a, portion 501 of the center plug 500 has formed in the interior of the plug a triangularly shaped spring means comprising spring wire section 503. Wire 503 is arranged in a triangular shape in the interior of circular, annular ridge 509 which serves both to hold wire 503 and to provide an outer stop for the inner diameter of disk 110. Cylindrical nob 505a protrudes outward from the center of the interior of portion 501 of plug 500 so that its cross-sectional planar end is coplanar with the top of annular ridge 509. Wire 503 is configured such that center protrusion 504 on portion 502 of plug 500 as shown in FIG. 5b fits within the triangle formed by wire 503 in such a manner that wire 503 presses tangentially and hard against circumferential surface 506 of protrusion 504. Cylindrical hole 505b, extending through the center of protrusion 504, allows for the receipt of cylindrical knob 505a. As shown in FIG. 5c, the center protrusion 504 has a tapered circumferential surface 506 such that the diameter d1 of the protrusion 504 where the protrusion 504 joins base 502 is less than the diameter d2 of protrusion 504 at its end furthest from base 502. Accordingly wire 503 will tend to pull plug portion 502 toward plug portion 501. However, as the disk 110 (FIG. 5d) expands in thickness due to a change in its temperature during the sputtering process, the plug 500 also must expand to accomodate the disk 110. Thus portions 501 and 502 will be pushed apart but wire 503 will merely ride along surface 506 of plug 504 from the smaller toward the larger diameter. The plug 500 remains tightly located within the center hole of disk 110 thereby preventing particle generation while traveling to accomodate the thermal expansion of disk 110. Any particles generated by the movement of wire 503 against surface 506 are kept within the hole within disk 110 by the tight clamping of plug 500 against the two surfaces of disk 110 adjacent the hole in the disk. Thus the plug does not rattle on the disk or pop off the disk when the disk expands.

Knob-like protrusions 508a and 508b extending outward from the exterior sides of portions 502 and 501, respectively, as shown in FIG. 5d, allow the disk clamped in the plug to be handled by a person or a robot for placement in the carrier 100 or removal from the carrier.

FIGS. 6a through 6d illustrate a second embodiment of the center plug 500 for placement in the center of each memory disk during the sputtering operation in accordance with this invention. As shown in FIG. 6a, portion 601 of the center plug 500 has formed in the interior of the plug a circular annular ridge 609. Ridge 609 serves both to hold spring wire means 604 and to provide an outer stop for the inner diameter of disk 110. Spring wire means 604 is placed within annular ridge 609 forming an elongated oval along a cross-sectional diameter of the portion 601. Wire 604 is further configured such that center protrusion 605 on portion 602 of plug 500 as shown in FIG. 6b fits within the oval formed by wire 604 in such a manner that wire 604 presses tangentially and hard against circumferential surface 607 of protrusion 605. As shown in FIG. 6c, the center protrusion 605 has a tapered circumferential surface 607 such that the diameter d4 of the protrusion 605 where the protrusion 605 joins base 606 is less than the diameter d3 of protrusion 605 at its end furthest from base 606. Accordingly, wire 604 will tend to pull plug portion 602 toward plug portion 601. Knob-like protrusions 608a and 608b (FIG. 6d) extending outward from the exterior sides of portions 602 and 601, respectively, allow the disk clamped in the plug to be handled by a person or robot for placement in or removal from carrier 100.

In practice a number of disks are placed simultaneously in a carrier containing a plurality of openings as shown in FIG. 4 thereby allowing the magnetic media to be sputtered simultaneously on all surfaces of the disks in the carrier.

While one embodiment of the above invention has been described, other embodiments of this invention will be obvious in view of this disclosure. In particular, other embodiments of the plug using other configurations for the spring 503 and the protrusion 504 will be obvious in view of this disclosure.

What is claimed is:

1. A carrier for use in holding a disk, said disk having plane surfaces on opposite sides thereof on which magnetic or other material is to be coated simultaneously, said carrier holding said disk in such a manner as to prevent contact between the plane surfaces to be coated on the disk and the carrier, said carrier comprising:

a carrier plate;

a first opening formed through said carrier plate, said first opening having a diameter slightly less than the diameter of the said disk, said first opening being circular and formed around a first center line;

a second opening formed partly through said carrier plate, said second opening being formed with a slightly larger than said first opening and being formed only partially around the circumference of said first opening, said second opening being formed about a second center line offset from said first center line by a selected amount, said second opening thereby forming a recess in the carrier plate adjacent a portion of the circumference of said first opening;

wherein said recess extends part way into said carrier plate around a portion of the circumference of the first opening thereby to allow a disk having a diameter slightly more than the diameter of the first opening to be placed in said first opening without contacting the plane surfaces to be coated; and wherein a portion of a peripheral edge of said disk is aligned with an edge of a wall defining said first opening to prevent cross-contamination and interference between opposing electrodes on both sides of the disk during the simultaneous coating of magnetic or other material on both said plane surfaces of said disk.

2. Structure as in claim 1 wherein said carrier plate has means, formed in a portion of an edge of said first opening not adjacent said recess, for holding another portion of the peripheral edge of the disk.

3. Structure as in claim 2 wherein said carrier plate has a beveled edge adjacent the portion of said first opening not recessed thereby to reduce shadowing during the coating of magnetic or other material on said plane surfaces.

4. Structure as in claim 3 wherein the recess is formed over a first selected portion of the circumference of said first opening and wherein said means for holding another portion of the peripheral edge of the disk extends over the remaining portion of the circumference of said first opening.

5. Structure as in any one of claims 1, 2, 3 or 4 wherein a plurality of first and second openings are formed in said carrier plate to allow both plane surfaces of each of a corresponding plurality of disks inserted into said openings to be coated simultaneously with magnetic or other material.

* * * * *

UNITED STATES PATENT AND TRADEMARK OFFICE
CERTIFICATE OF CORRECTION

PATENT NO. : 4,595,481
DATED : June 17, 1986
INVENTOR(S) : Ronald Allen and Tu Chen It is certified that error appears in the above-identified patent and that said Letters Patent is hereby corrected as shown below:

Col. 3, line 29, replace "carrier 101" with --carrier 100--.

Col. 3, line 39, between "in" and "without" insert --opening 102--.

Col. 3, line 53, delete "in".

Col. 4, line 20, replace "carrier 101" with --carrier 100--.

Col. 4, line 45, replace "at-rest" (without quote marks) with --"at-rest"-- (with quote marks).

Col. 4, line 48, after "side" delete "of".

Col. 4, line 54, delete "depth".

Col. 7, line 19, between "larger" and "than" insert --diameter--.

Signed and Sealed this

Eighteenth Day of August, 1987

Attest:

DONALD J. QUIGG

*Attesting Officer*     *Commissioner of Patents and Trademarks*